(12) United States Patent
Candelore

(10) Patent No.: US 6,298,400 B1
(45) Date of Patent: Oct. 2, 2001

(54) ENHANCING INTERFACE DEVICE TO TRANSPORT STREAM OF PARALLEL SIGNALS TO SERIAL SIGNALS WITH SEPARATE CLOCK RATE USING A PIN REASSIGNMENT

(75) Inventor: Brant L. Candelore, Escondido, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/417,532

(22) Filed: Oct. 13, 1999

(51) Int. Cl.[7] .......................... G06F 13/12; G06F 13/38; G06F 3/00
(52) U.S. Cl. ........................... 710/71; 710/20; 710/64; 713/600
(58) Field of Search ........................... 370/112, 536; 710/7, 33, 38, 71, 20, 21, 64; 713/600

(56) References Cited

U.S. PATENT DOCUMENTS

| | | | |
|---|---|---|---|
| 4,965,797 | * | 10/1990 | Yamane et al. ................ 370/537 |
| 5,675,654 | * | 10/1997 | Ryan ................................ 380/48 |
| 5,701,515 | * | 12/1997 | Gradeler ........................... 710/14 |
| 5,760,707 | * | 6/1998 | Katagiri ...................... 340/870.11 |
| 5,761,209 | * | 6/1998 | Murakami ....................... 370/536 |
| 5,812,976 | * | 9/1998 | Ryan .............................. 704/201 |
| 5,933,500 | * | 8/1999 | Blatter et al. ..................... 380/20 |
| 6,040,851 | * | 3/2000 | Cheng et al. ..................... 348/10 |

* cited by examiner

Primary Examiner—Thomas Lee
Assistant Examiner—Chun Cao
(74) Attorney, Agent, or Firm—Blakely, Sokoloff, Taylor & Zafman LLP

(57) ABSTRACT

The present invention is a method and apparatus for enhancing interface between a host and a point of deployment (POD) module having parallel signal paths carrying parallel signals of a transport stream. The parallel signals operate at a parallel clock rate. An interface card has a serial portion to provide serial signal paths carrying serial signals between the host and the POD module. Each of the serial signals corresponds to the parallel signals. Each of the serial signals operating at a serial clock rate.

24 Claims, 6 Drawing Sheets

| Pin | Signal | I/O | NEW Function |
|---|---|---|---|
| 20 | SCLKI0 | I | Serial data clock in 0 |
| 37 | SDO3 | O | Serial data out 3 |
| 38 | Not Used | O | N/A |
| 39 | Not Used | O | N/A |
| 40 | Not Used | O | N/A |
| 41 | Not Used | O | N/A |
| 47 | SDI0 | I | Serial data in 0 |
| 48 | SDI1 | I | Serial data in 1 |
| 49 | SDI2 | I | Serial data in 2 |
| 50 | SDI3 | I | Serial data in 3 |
| 53 | SCLKI1 | I | Serial data clock in 1 |
| 54 | SCLKI2 | I | Serial data clock in 3 |
| 55 | SCLKI3 | I | Serial data clock in 4 |
| 56 | Not Used | I | N/A |
| 57 | Not Used | O | N/A |
| 64 | SDO0 | O | Serial data out 0 |
| 65 | SDO1 | O | Serial data out 1 |
| 66 | SDO2 | O | Serial data out 2 |

FIG. 5

| Pin | Signal | I/O | NEW Function |
|---|---|---|---|
| 20 | SCLKI0 | I | Serial data clock in 0 |
| 37 | SCLKO1 | O | Serial data clock out 1 |
| 38 | SDO2 | O | Serial data out 2 |
| 39 | SCLKO2 | O | Serial data clock out 2 |
| 40 | SDO3 | O | Serial data out 3 |
| 41 | SCLKO3 | O | Serial data clock out 3 |
| 47 | SDI0 | I | Serial data in 0 |
| 48 | SDI1 | I | Serial data in 1 |
| 49 | SDI2 | I | Serial data in 2 |
| 50 | SDI3 | I | Serial data in 3 |
| 53 | SCLKI1 | I | Serial data clock in 1 |
| 54 | SCLKI2 | I | Serial data clock in 3 |
| 55 | SCLKI3 | I | Serial data clock in 4 |
| 56 | Not Used | I | N/A |
| 57 | Not Used | O | N/A |
| 64 | SDO0 | O | Serial data out 0 |
| 65 | SCLKO0 | O | Serial data clock out 0 |
| 66 | SDO1 | O | Serial data out 1 |

FIG. 6

| Pin | Signal | I/O | Function |
|---|---|---|---|
| 1 | GND | | Ground |
| 2 | D3 | I/O | Data bit 3 |
| 3 | D4 | I/O | Data bit 4 |
| 4 | D5 | I/O | Data bit 5 |
| 5 | D6 | I/O | Data bit 6 |
| 6 | D7 | I/O | Data bit 7 |
| 7 | CE1# | I | Card enable 1 |
| 8 | A10 | I | Address bit 10 |
| 9 | OE# | I | Aoutput enable |
| 10 | A11 | I | Address bit 11 |
| 11 | A9 | I | Address bit 9 |
| 12 | A8 | I | Address bit 8 |
| 13 | A13 | I | Address bit 13 |
| 14 | A14 | I | Address bit 14 |
| 15 | WE# | I | Write enable |
| 16 | IREQ# | O | Interrup request |
| 17 | VCC | | Vcc |
| 18 | VPP1 | | Program voltage 1 |
| 19 | MIVAL | I | MP in valid |
| 20 | *CLKI* | *I* | *Serial data clock in 0* |
| 21 | A12 | I | Address bit 12 |
| 22 | A7 | I | Address bit 7 |
| 23 | A6 | I | Address bit 6 |
| 24 | A5 | I | Address bit 5 |
| 25 | A4 | I | Address bit 4 |
| 26 | A3 | I | Address bit 3 |
| 27 | A2 | I | Address bit 2 |
| 28 | A1 | I | Address bit 1 |
| 29 | A0 | I | Address bit 0 |
| 30 | D0 | I/O | Data bit 0 |
| 31 | D1 | I/O | Data bit 1 |
| 32 | D2 | I/O | Data bit 2 |
| 33 | IOIS16# | | 16bit I/O (always high) |
| 34 | GND | | Ground |

| Pin | Signal | I/O | Function |
|---|---|---|---|
| 35 | GND | | Ground |
| 36 | CD1# | O | Card detect 1 |
| 37 | *SDO3* | *O* | *Serial data out 3* |
| 38 | *SDO4* | *O* | *Serial data out 4* |
| 39 | *SDO5* | *O* | *Serial data out 5* |
| 40 | *SCLK1* | *O* | *Serial clock in 1* |
| 41 | *SCLK2* | *O* | *Serial clock in 2* |
| 42 | CE2# | I | Card enable 2 |
| 43 | VS1# | O | Voltage sense 1 |
| 44 | IORD# | I | I/O read |
| 45 | IOWR# | I | I/O write |
| 46 | MISTRT | I | MP in start |
| 47 | *SDI0* | *I* | *Serial data in 0* |
| 48 | *SDI1* | *I* | *Serial data in 1* |
| 49 | *SDI2* | *I* | *Serial data in 2* |
| 50 | *SDI3* | *I* | *Serial data in 3* |
| 51 | VCC | | Vcc |
| 52 | VPP2 | | Program Voltage 2 |
| 53 | *SDI4* | *I* | *Serial data in 4* |
| 54 | *SDI5* | *I* | *Serial data in 5* |
| 55 | *SCLKI3* | *I* | *Serial clock in 3* |
| 56 | *SCLKI4* | *I* | *Serial clock in 4* |
| 57 | *SCLKI5* | *I* | *Serial clock in 5* |
| 58 | RESET | I | Card reset |
| 59 | WAIT# | O | Extend bus cycle |
| 60 | INPACK# | O | Input port ack |
| 61 | REG# | I | Register select |
| 62 | MOVAL | O | MP out valid |
| 63 | MOSTRT | O | MP out start |
| 64 | *SDO0* | *O* | *Serial data out 0* |
| 65 | *SDO1* | *O* | *Serial data out 1* |
| 66 | *SDO2* | *O* | *Serial data out 2* |
| 67 | CD2# | O | Card detect 2 |
| 68 | GND | | Ground |

FIG. 7

ENHANCING INTERFACE DEVICE TO TRANSPORT STREAM OF PARALLEL SIGNALS TO SERIAL SIGNALS WITH SEPARATE CLOCK RATE USING A PIN REASSIGNMENT

BACKGROUND

1. Field of the Invention

The present invention is related to transport streams. In particular, the present invention is related to enhancing interface to transport streams.

2. Description of Related Art

Modern set-top boxes generally have a receiver to receive program data, or content, from a service provider and generate multiple transport streams. The content is normally scrambled before being transmitted to the receiver. The scrambled content is then de-scrambled by a conditional access (CA) device. Currently, entitlement management messages (EMM) typically use unique keys or signatures to deliver a group key or access parameters to CA devices. An EMM is a message used to deliver privileges (e.g., rights, keys) to a CA device. Typically the group are users or customers who share a particular set of entitlements.

The multiple transport streams are received by CA devices at several points of deployment (PODs). The architecture of the interface to the transport streams at the PODs defines how the transport streams are transferred and processed. An example of such an interface definition is the NRSS-B interface. The National Renewable Security System (NRSS)-B interface is characterized by pin assignments at the connector. The interface makes wasteful use of pins by sending and returning only one transport stream from the host to the CA module in parallel byte mode.

In picture-in-picture (PiP) systems, there are multiple transport streams corresponding to multiple picture sources. To accommodate multiple transport streams in PiP applications, multiple CA devices have to be used. This results in wasteful hardware resources and increases costs.

Therefore, there is a need to have an efficient technique to enhance the interface to the transport streams.

SUMMARY

The present invention is a method and apparatus for enhancing interface between a host and a point of deployment (POD) module having parallel signal paths carrying parallel signals of a transport stream. The parallel signals operate at a parallel clock rate. An interface card has a serial portion to provide serial signal paths carrying serial signals between the host and the POD module. Each of the serial signals corresponds to the parallel signals. Each of the serial signals operating at a serial clock rate.

BRIEF DESCRIPTION OF THE DRAWINGS

The features and advantages of the present invention will become apparent from the following detailed description of the present invention in which:

FIG. 5 is a diagram illustrating a pin assignment to accommodate four simultaneous serial transport streams having common serial clocks according to one embodiment of the invention.

FIG. 6 is a diagram illustrating a pin assignment to accommodate four simultaneous serial transport streams having separate serial clocks according to one embodiment of the invention.

FIG. 7 is a diagram illustrating an overall pin assignment to accommodate six simultaneous serial transport streams according to one embodiment of the invention.

DESCRIPTION

The present invention is a method and apparatus to enhance interface between a host and a point of deployment (POD) module having parallel signal paths carrying parallel signals of a transport stream. The parallel signals operate at a parallel clock rate. An interface card has a serial portion to provide serial signal paths carrying serial signals between the host and the POD module. Each of the serial signals corresponds to the parallel signals. Each of the serial signals operating at a serial clock rate.

The technique re-assigns the pins at the interface and to convert parallel signals into serial signals. The advantages of this technique include increase in the number of transport streams and provision for many independent functional modules to use the interface card in serial mode.

In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown where unnecessary for an understanding of the present invention.

Figure 1:
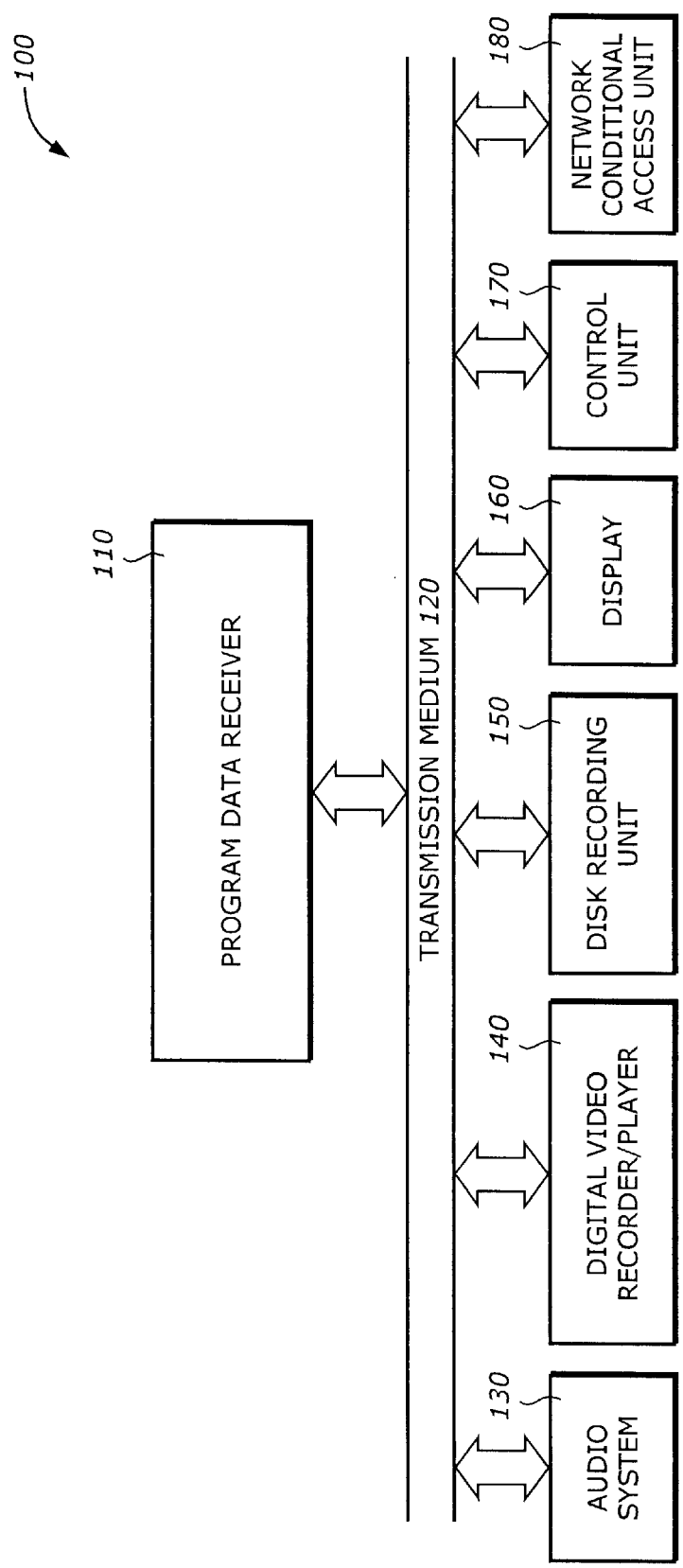
FIG. 1 is a diagram illustrating a system in which one embodiment of the invention can be practiced.

FIG. 1 is a diagram illustrating a system 100 in which one embodiment of the invention can be practiced.

The system 100 includes a program data receiver 110, a transmission medium 120, an audio system 130, a digital video recorder or player 140, a disk recording unit 150, a display 160, a control unit 170, and a network CA unit 180.

The program data receiver 110 receives digital bitstream or data including program data from one or more service providers. Such service or content providers may include terrestrial broadcasters, cable operators, direct broadcast satellite (DBS) companies, companies providing content for download via the Internet, book publisher, software companies distributing software products, or any similar content and/or service provider. The program data may include system information, entitlement control messages, entitlement management messages, content, and other data. System information may include information on program names, time of broadcast, source, method of retrieving and decoding, copy management commands that provide digital receivers and other devices that control how, when, and what program data may be replayed, retransmitted, copied, and/or recorded. These copy management commands may also be transmitted along with entitlement control messages (ECM), which are generally used by the conditional access unit to regulate access to a particular channel or service. Entitlement management messages (EMM) may be used to deliver privileges such as rights and de-scrambling keys. As known, a decryption or de-scrambling key is generally a code that is required to restore the scrambled data, and may be a function of the rights granted. Finally, content in the program data may include audio and video data, which may be in scrambled or encrypted or clear format.

The transmission medium 120 operates to transmit control information and data including program data between the program data receiver 110 and other components in the system 100. The transmission medium 120 may include air, fiber optics, electronic and magnetic media, computer network connection, telephone connection, and any other communication media.

The audio system 130 is coupled to the transmission medium 130 to provide audio services. The audio system 130 may include speakers, an audio player/recorder such as a compact disk player, or other magneto-optical disc that may be used to play and/or record audio data. The digital video recorder/player 140 is coupled to the transmission medium 120 to provide video services. The digital video recorder/player 140 may be used to record analog or digital video, audio, and other data transmissions. In one embodiment, the digital video recorder/player 140 may be used to replay or record the program data received by the program data receiver 110 and transmitted over the transmission medium 120.

The disk recording unit 150 may also be coupled to the program data receiver 110 and other components via the transmission medium 120. The disk recording unit 150 may be a personal computer system, a stand-alone hard disk recording unit, or other disk recording device capable of recording analog or digital audio, video and data transmissions, including the program data received and transmitted by the program data receiver 110.

The display 160 may include a television display, a monitor display or other devices capable of processing and displaying video signals. In one embodiment, the display 160 is a digital television set. The control unit 170 may also be coupled to the transmission medium 120 to coordinate and control the operation of some or each of the components on the system 100, as well as other devices remotely coupled thereto.

The network conditional access (CA) unit 180 may also be coupled to the transmission medium 120. The network CA unit 180 operates to re-scramble program data with content in clear format such that the system 100 supports the simultaneous transmission of program data in clear and scrambled format. The network CA unit 180 may be a CA device that operates as a second CA device in a system embodiment where the program data receiver 110 operates as a master CA device.

Figure 2:
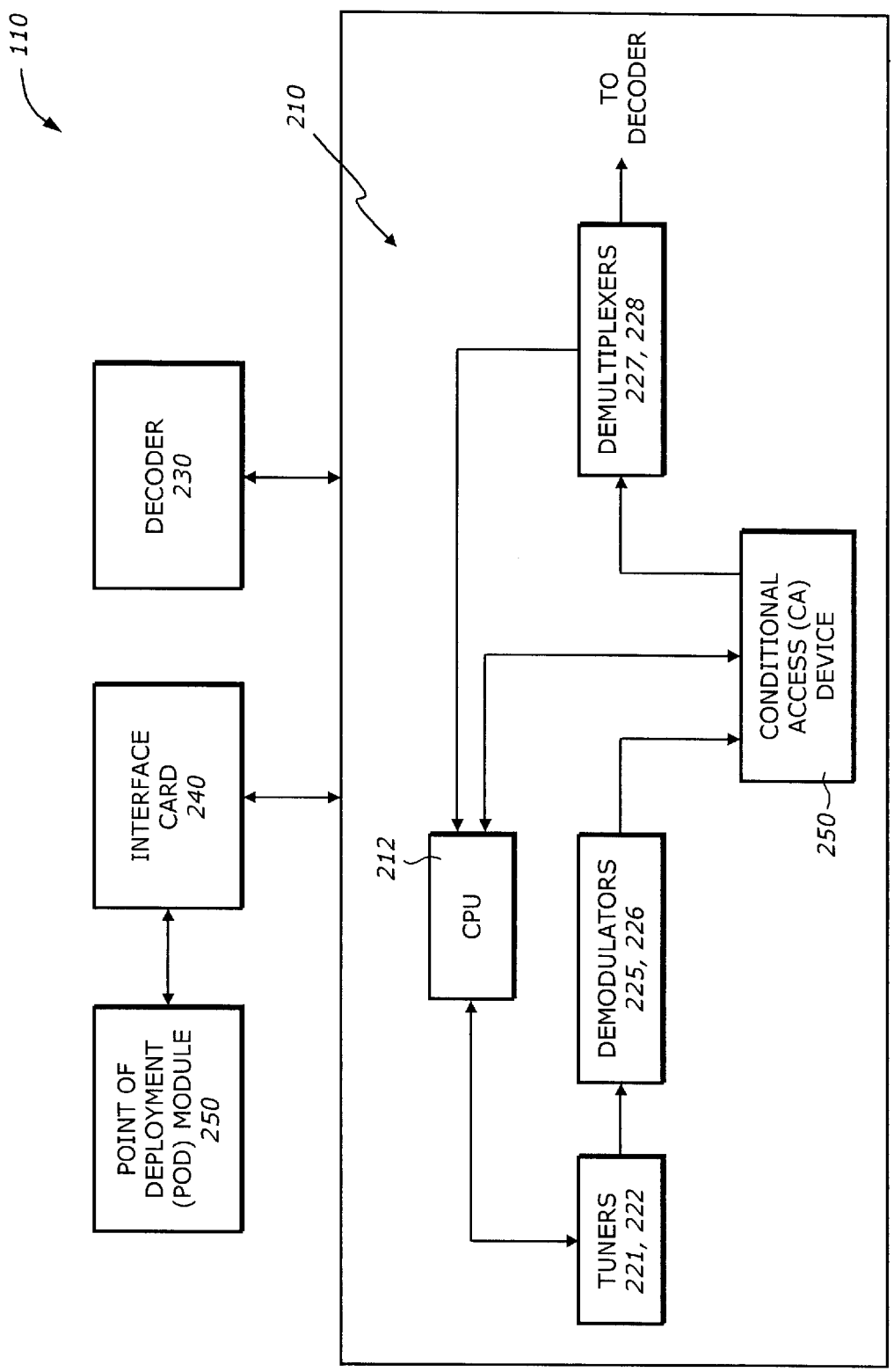
FIG. 2 is a diagram illustrating the program data receiver in FIG. 1 according to one embodiment of the invention.

FIG. 2 is a diagram illustrating a program data receiver 110 according to one embodiment of the invention. The program data receiver 110 includes a digital receiver 210, a decoder 230, and interface card 240, and a point of deployment (POD) module 250.

The digital receiver 210 includes a central processing unit (CPU) 212, tuners 221 and 222, demodulators 225 and 226, and demultiplexers 227 and 228.

The CPU 212 performs control functions for the tuners 221 and 222 receives system information from the demultiplexers 227 and 228. The CPU 212 may determine the frequency in which a channel is broadcast or otherwise transmitted. The CPU 212 may support a graphical user interface (GUI), such as electronic programming guide (EPG) to allow a user to navigate through various channels and program options to select a desired channel or program for viewing, listening, recording and the like.

Each of the tuners 221 and 222 selects a frequency of the signal received by the program data receiver 110 (in FIG. 1) under the control of the CPU 212. The tuners 221 and 222 process, amplify, digitize, and generate bitstreams to the demodulators 225 and 226, respectively.

The demodulators 225 and 226 demodulate the bitstreams received from the corresponding tuners 221 and 222 to provide the program data as originally transmitted. The type of demodulation performed by the demodulators 225 and 226 depends on the type of transmission as well as the modulation process used in the transmission process. Examples of the demodulation includes quadrature amplitude modulation (QAM) demodulation, quadrature phase shift key (QPSK) demodulation, and vestigial side band (VSB) demodulation. In addition, the demodulators 225 and 226 may perform error correction on the received bitstreams.

The interface card 240 provides signal paths for the bitstreams between the demodulators 225 and 226, the POD module 250, and the demultiplexers 227 and 228. The interface card 240 is configured to provide serial signal paths carrying serial signals. The serial signals correspond to the parallel signals of the transport streams.

The POD module 250 may be integral or external to the digital receiver or the host 210. The POD module 250 may be a conditional access (CA) device which provides conditional access to the program data as provided by the demodulators 225 and 226. The program data is typically scrambled using an access key. The POD module 250 may be used in an external or split mode. In the external mode, the POD module 250 de-scrambles the program data content and decrypts the keys externally; e.g., as is the case with the National Renewable Security System (NRSS) conditional access modules. In a split conditional access unit, the program data content is de-scrambled within the digital receiver or the host 210, while the key decryption is done externally, e.g., via a smart card.

The demultiplexers 227 and 228 receive the de-scrambled o r unscrambled contents from the POD module 250 via the interface card 240. The demultiplexers 227 and 228 separate the system information from the content in the program data, and according to one embodiment, parses the program data for packet identifiers that are associated with the system information, audio information, and video information, and then transmits the system information to the CPU 210 and the audio and video information to the decoder 230.

The decoder 230 receives the extracted program data from the digital receiver 210. The decoder 230 receives the two descrambled bitstreams from the demultiplexers 227 and 228. The decoder 230 separates the system information from the content, decodes or decompresses the content to its original form. In addition, the decoder 230 composes a PIP display that integrates both bitstreams in the same display to be displayed on the display monitor. It should be appreciated that more than two bitstreams can be used to provide more PIP capabilities. In one embodiment, the program data receiver 110 is a television set where the digital receiver 210 is a set-top box integrated therein, and the decoder 230 is a Motion Picture Experts Group (MPEG) decoder.

Figure 3:
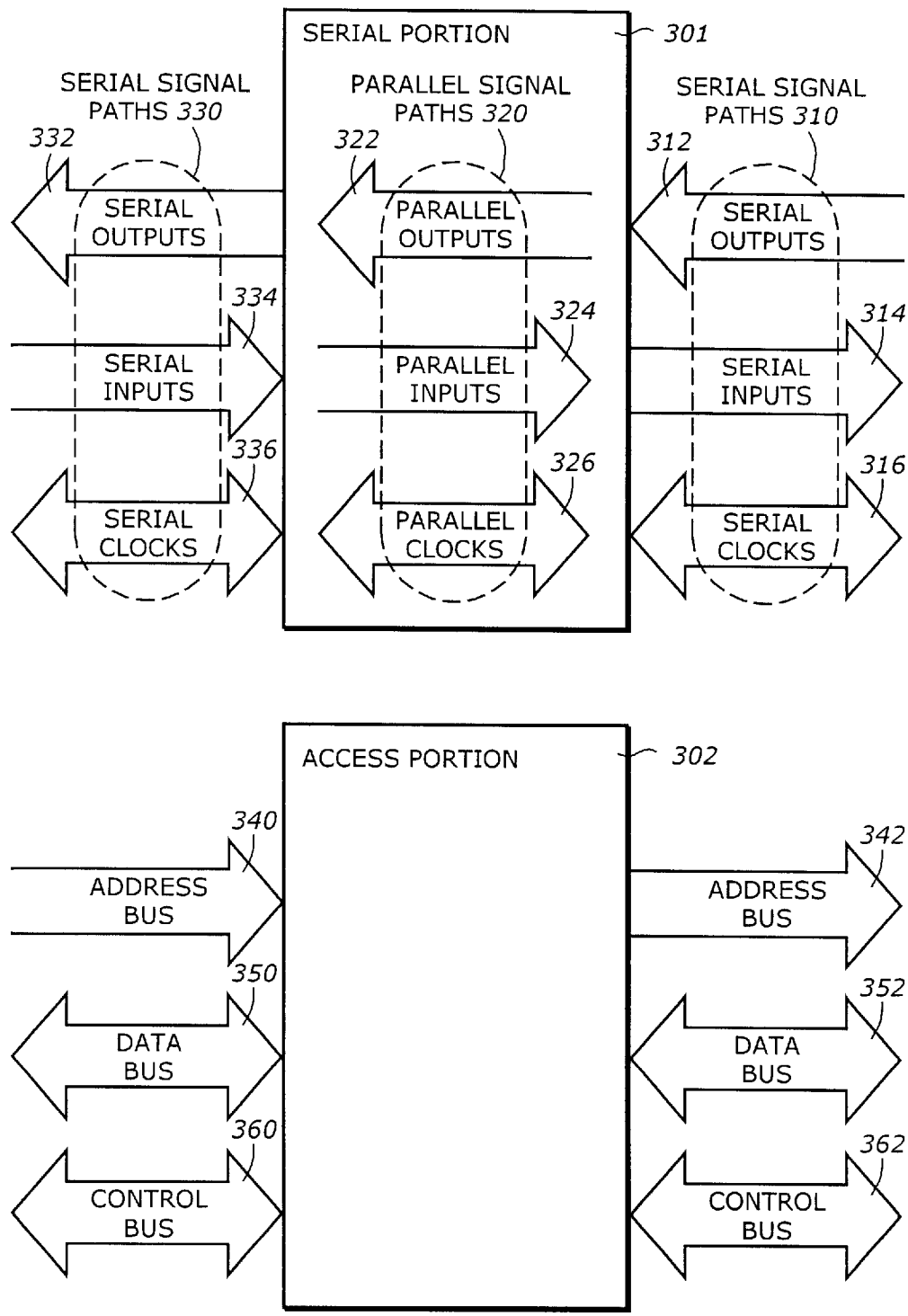
FIG. 3 is a diagram illustrating an interface card according to one embodiment of the invention.

FIG. 3 is a diagram illustrating an interface card 240 according to one embodiment of the invention. The interface card 240 comprises a serial portion 301 and an access portion 302. The interface card 240 enhances interface between the digital receiver or the host 210 (in FIG. 2) and the POD module 250 (in FIG. 2). In one embodiment, the interface between the host 210 and the POD module 250 is defined by a parallel data protocol such as one from the NRSS-B. The NRSS-B interface card has parallel signal paths carrying parallel signals of a transport stream such as the bitstream from the demodulator 225 or 226. The parallel signals operate at a parallel clock rate.

The serial portion 301 provides serial signal paths carrying serial signals between the host 210 and the POD module 250 (shown in FIG. 2). Each of the serial signals corresponds to the parallel signals and operates at a serial clock rate.

The serial portion 301 includes parallel signal paths 320 as defined by the parallel data protocol. The parallel signal paths 320 include parallel output paths 322 carrying parallel output signals, parallel input paths 324 carrying parallel input signals, and parallel clock paths 326 carrying clock signals. The parallel output and input signals operate at parallel clock rates as determined by corresponding clock signals. The serial portion 301 provides serial signal paths 310 and 330 at two sides of the interface card 240. The serial signal paths 310 includes serial output paths 312 carrying serial output signals, serial input paths 314 carrying serial input signals, and serial clock paths 316 carrying serial clock signals. Similarly, the serial signal paths 330 includes serial output paths 332 carrying serial output signals, serial input paths 334 carrying serial input signals, and serial clock paths 336 carrying serial clock signals. The serial output paths 312, serial input paths 314, and serial clock paths 316 correspond to the serial output paths 332, serial input paths 334, and serial clock paths 336. In addition, the serial paths 312, 314, 316, 332, 334, and 336 correspond to the parallel paths 322, 324, and 326 according to a pin re-assignment of the interface card.

The parallel signal paths 320 correspond to a pin assignment according to the parallel data protocol. The pin assignment is re-assigned to map a group of parallel signal paths into a serial signal path. In addition, the pin re-assignment also maps a parallel clock path into a serial clock path. In this manner, the interface card previously can only handle a single transport stream operating in parallel now can handle multiple transport streams operating serially. The result is that a single interface card can now support multiple transport streams which can be integrated into a single POD module. The number of POD modules in the digital receiver is significant reduced when multiple transport streams are desired as in PIP applications. In this way, more types of transport streams can be used. For example, one input stream may have two output streams, one is a scrambled version and one is a re-scrambled version using local or other keys and access criteria.

The access portion 302 includes the address buses 340 and 342, the data buses 350 and 352, and the control buses 360 and 362. The access portion 302 allows an access between the host 210 and the POD module 250.

For example, at power up, the host may want to initialize the POD module, or read some status values. This can be done by issuing an address on the address bus 340 on the host side which is translated to the address bus 342 on the POD module side. The address may correspond to a memory or a register located on the POD module. Then the POD module side responds with data from the specified memory location or register onto the data bus 352 which is translated into the data bus 350 on the host side. The control bus 360 and 362 may include control signals like read/write, channel select, etc.

The access portion allows the POD module 250 to inform the transfer mode (e.g., serial capability) to the host so that appropriate configuration can be done. For example, the host may prepare to control the transfer of data in serial mode, or to switch relevant bidirectional buffers.

Figure 4:
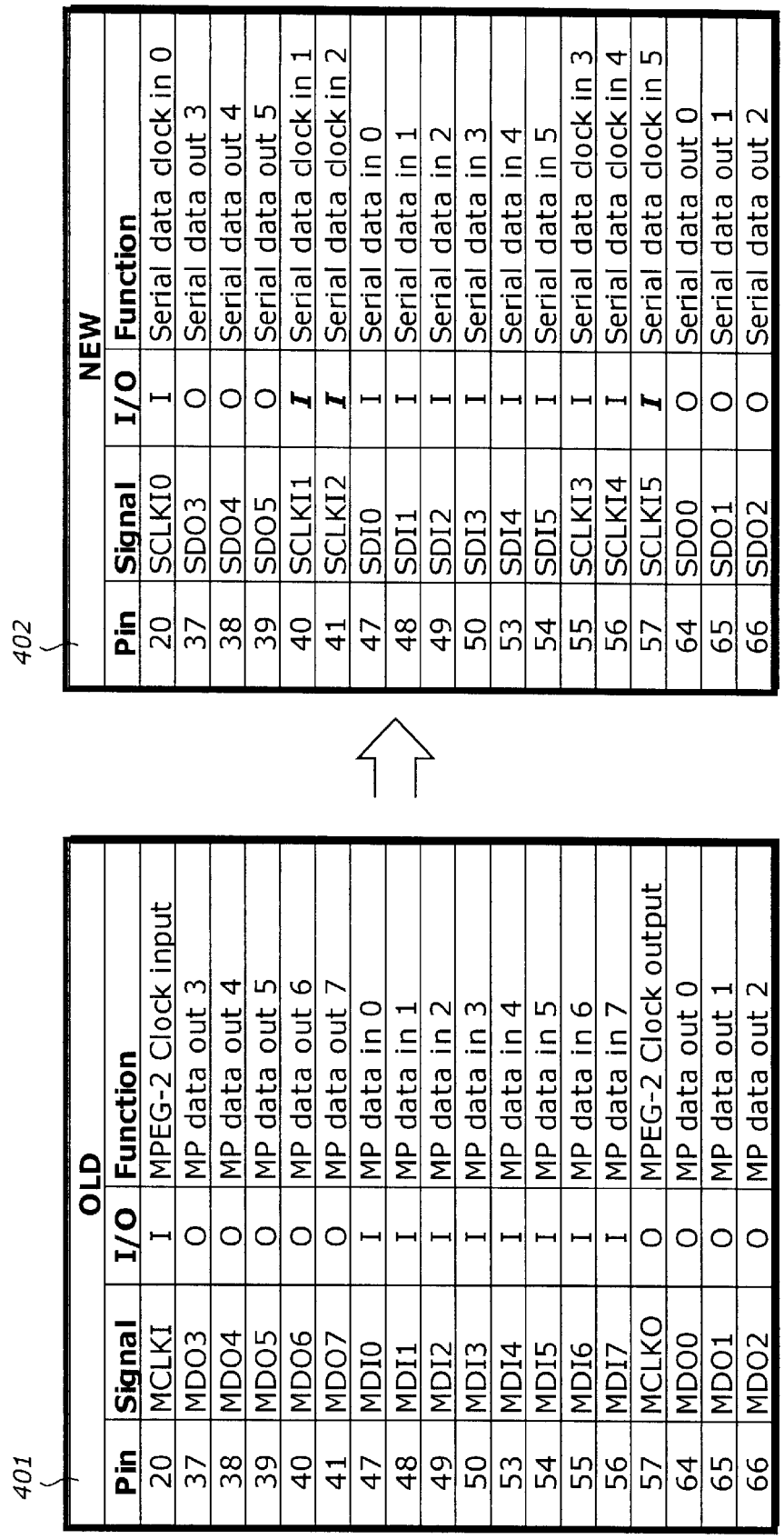
FIG. 4 is a diagram illustrating a pin assignment to accommodate six simultaneous serial transport streams according to one embodiment of the invention.

FIG. 4 is a diagram illustrating a pin re-assignment to accommodate six simultaneous serial transport streams according to one embodiment of the invention. The pin re-assignment reassigns the pin numbers of the NRSS-B interface card from an assignment 401 to an assignment 402.

The assignment 401 includes eight output signals (MDO0 to MDO7), eight input signals (MDI0 to MDI7), one input clock signal (MCLKI), and one output clock signal (MCLKO). The eight input and output signals correspond to one transport stream. The assignment 402 includes six serial output signals (SDO0 to SDO5), six serial input signals (SDI0 to SDI5), and six clock signals (SCLKI0 to SCLKI5). Each of the serial input and output signals corresponds to a transport stream. Therefore, the assignment 402 can support a total of six different transport streams operating at six separate clock signals.

In the assignment 402, some signals may have opposite polarities. For example, the SCLKI1 (pin 40), the SCLKI2 (pin 41), and the SCLKI5 (pin 57) are inputs while the corresponding pins in the assignment 401 are outputs. This may not be a problem because a bidirectional buffer can be used at each of these pins. At the time of configuration, these bidirectional buffers can be switched according to the configured mode of transfer.

FIG. 5 is a diagram illustrating a pin assignment to accommodate four simultaneous serial transport streams having common serial clocks according to one embodiment of the invention. The pin re-assignment reassigns the pin numbers of the NRSS-B interface card from the assignment 401 shown in FIG. 4 to an assignment 502.

The assignment 502 includes four serial output signals (SDO0–SDO3), four serial input signals (SDI0–SDI3), and four serial clock signals (SCLKI0–SCLK3). The assignment 502 avoids the reverse polarity problem in the assignment 402 as shown in FIG. 4. However, the number of signals is reduced from six to four.

In addition, in the assignment 502, the serial output signal and the corresponding serial input signal have the same corresponding serial clock signal.

FIG. 6 is a diagram illustrating a pin assignment 602 to accommodate four simultaneous serial transport streams having separate serial clocks according to one embodiment of the invention. The pin re-assignment reassigns the pin numbers of the NRSS-B interface card from the assignment 401 shown in FIG. 4 to an assignment 602.

The assignment 602 includes four serial output signals (SDO0-SDO3), four serial input signals (SDI0–SDI3), four serial output clock signals (SCLKO0–SCLKO3), and four serial input clock signals (SCLKI0–SCLKI3). As in the assignment 502, the assignment 602 avoids the reverse polarity problem in the assignment 402 as shown in FIG. 4. The number of signals is also reduced from six to four.

The assignment 602 is different from the assignment 502 shown in FIG. 5 in that the serial output signal and the corresponding serial input signal have separate corresponding serial clock signal. This assignment supports application where there are different serial clock signals for input and output.

FIG. 7 is a diagram illustrating an overall pin assignment 702 to accommodate six simultaneous serial transport streams according to one embodiment of the invention. The pin re-assignment reassigns the pin numbers of the NRSS-B interface card from the assignment 401 shown in FIG. 4 to an assignment 702. The assignment 702 shows both the serial portion and the access portion.

The assignment 702 preserves the access portion of the interface card. The serial portion re-assigns the parallel data paths to serial data paths as shown in the assignment 602 in FIG. 6.

The present invention is a technique to re-assign the pins at the interface card to convert a parallel stream into multiple serial streams. The technique can be applicable for a number of interface standards or protocols including the NRSS, the Digital Video Broadcasting (DVB) Common Interface (CI) Modules used in Europe, and other similar interface cards.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method to enhance interface between a host and a point of deployment (POD) module having parallel signal paths carrying parallel signals of a transport stream, the parallel signals operating at a parallel clock rate, the method comprising:

providing serial signal paths carrying serial signals between the host and the POD module, each of the serial signals corresponding to the parallel signals, the parallel signals being mapped into the serial signal paths using a pin re-assignment, each of the serial signals operating at a serial clock rate.

2. The method of claim 1 further comprising:

providing a memory access between the host and the POD module.

3. The method of claim 1 wherein one of the serial signal paths corresponds to an output signal of the POD module.

4. The method of claim 3 wherein one of the serial signal paths corresponds to an input signal of the POD module.

5. The method of claim 1 wherein one of the serial signal paths corresponds to a serial clock signal operating at the serial clock rate.

6. The method of claim 2 wherein providing the memory access comprises establishing a serial transfer mode between the host and the POD module.

7. The method of claim 4 wherein the POD module is a conditional access (CA) module.

8. The method of claim 7 wherein the output signal corresponds to a re-scrambled version of the transport stream.

9. An interface card to enhance interface between a host and a point of deployment (POD) module having parallel signal paths carrying parallel signals of a transport stream, the parallel signals operating at a parallel clock rate, the interface card comprising:

a serial portion to provide serial signal paths carrying serial signals between the host and the POD module, each of the serial signals corresponding to the parallel signals, the parallel signals being mapped into the serial signal paths using a pin re-assignment, each of the serial signals operating at a serial clock rate.

10. The interface card of claim 9 further comprising:

an access portion to provide a memory access between the host and the POD module.

11. The interface card of claim 9 wherein one of the serial signal paths corresponds to an output signal of the POD module.

12. The interface card of claim 11 wherein one of the serial signal paths corresponds to an input signal of the POD module.

13. The interface card of claim 9 wherein one of the serial signal paths corresponds to a serial clock signal operating at the serial clock rate.

14. The interface card of claim 10 wherein the memory access establishes a serial transfer mode between the host and the POD module.

15. The interface card of claim 12 wherein the POD module is a conditional access (CA) module.

16. The interface card of claim 15 wherein the output signal corresponds to a re-scrambled version of the transport stream.

17. A system comprising:

a host;

a point of deployment (POD) module coupled to the host to transfer a transport stream; and an interface card coupled to the host and the POD module to enhance interface between the host and the point of deployment (POD) module having parallel signal paths carrying parallel signals of the transport stream, the parallel signals operating at a parallel clock rate, the interface card comprising:

a serial portion to provide serial signal paths carrying serial signals between the host and the POD module, each of the serial signals corresponding to the parallel signals, the parallel signals being mapped into the serial signal paths using a pin re-assignment, each of the serial signals operating at a serial clock rate.

18. The system of claim 17 wherein the interface card further comprises:

an access portion to provide a memory access between the host and the POD module.

19. The system of claim 17 wherein one of the serial signal paths corresponds to an output signal of the POD module.

20. The system of claim 19 wherein one of the serial signal paths corresponds to an input signal of the POD module.

21. The system of claim 17 wherein one of the serial signal paths corresponds to a serial clock signal operating at the serial clock rate.

22. The system of claim 18 wherein the memory access establishes a serial transfer mode between the host and the POD module.

23. The system of claim 20 wherein the POD module is a conditional access (CA) module.

24. The system of claim 23 wherein the output signal corresponds to a re-scrambled version of the transport stream.

* * * * *